Figure 1:
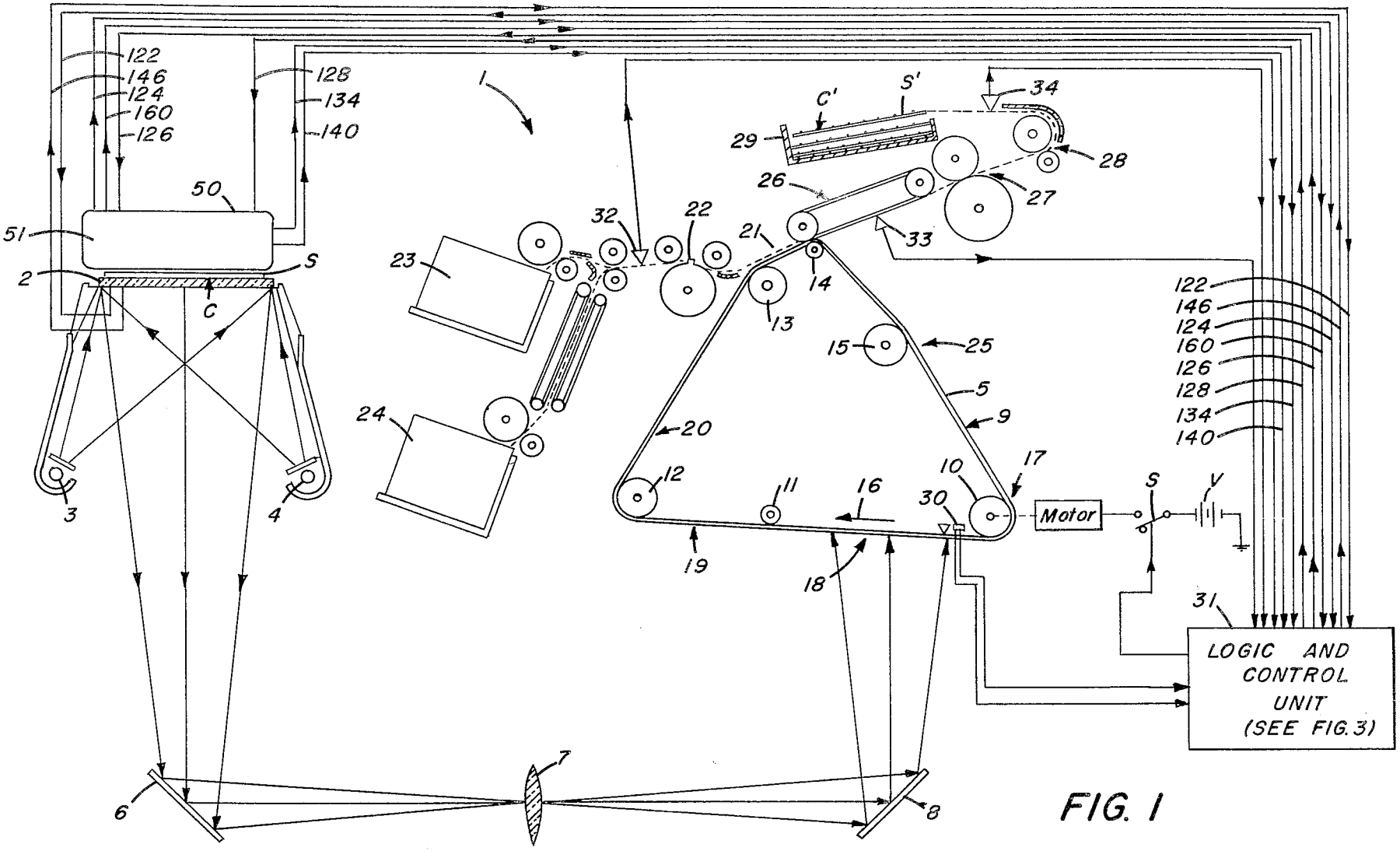
Figure 2:
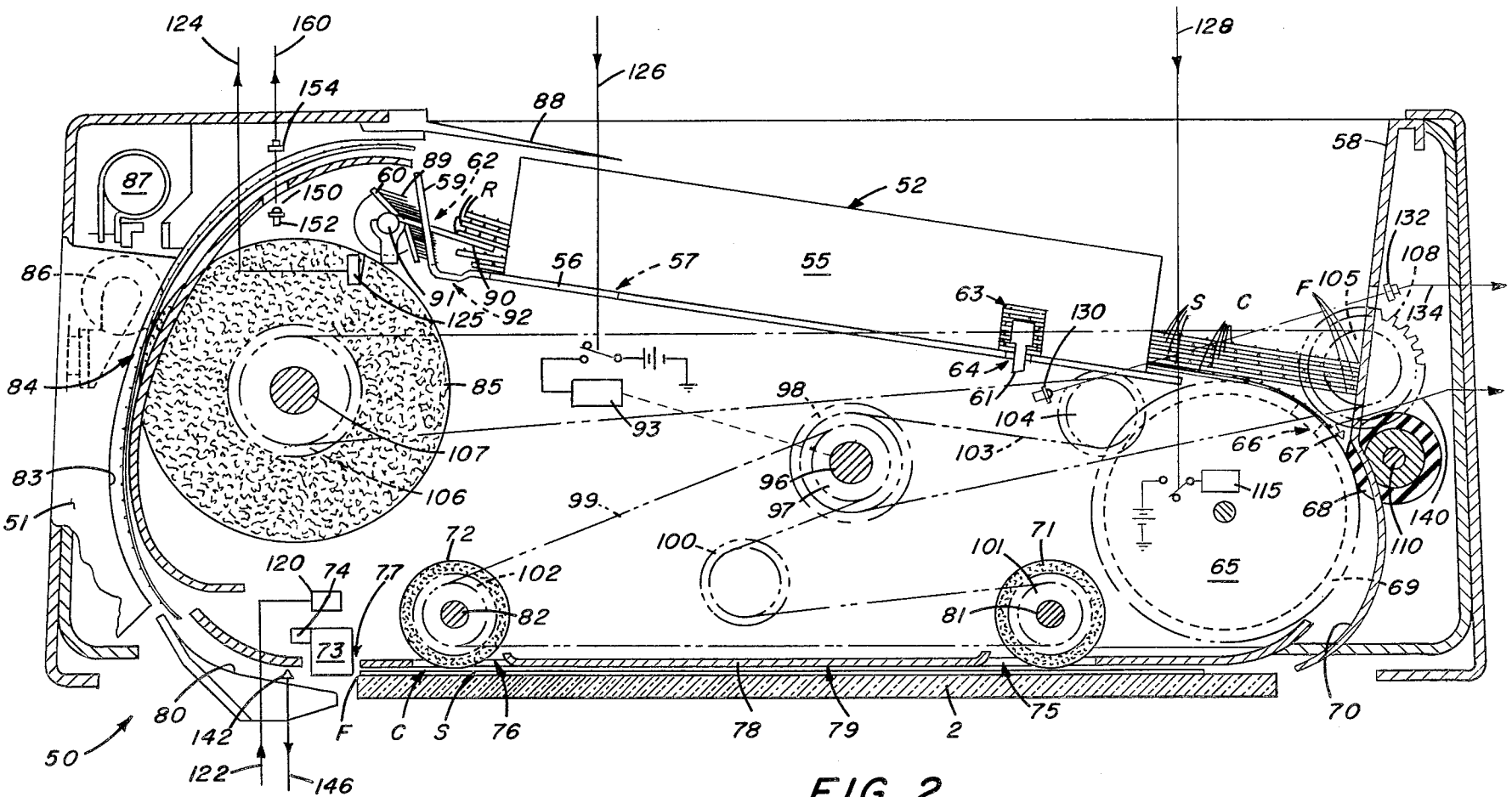
Figure 3:
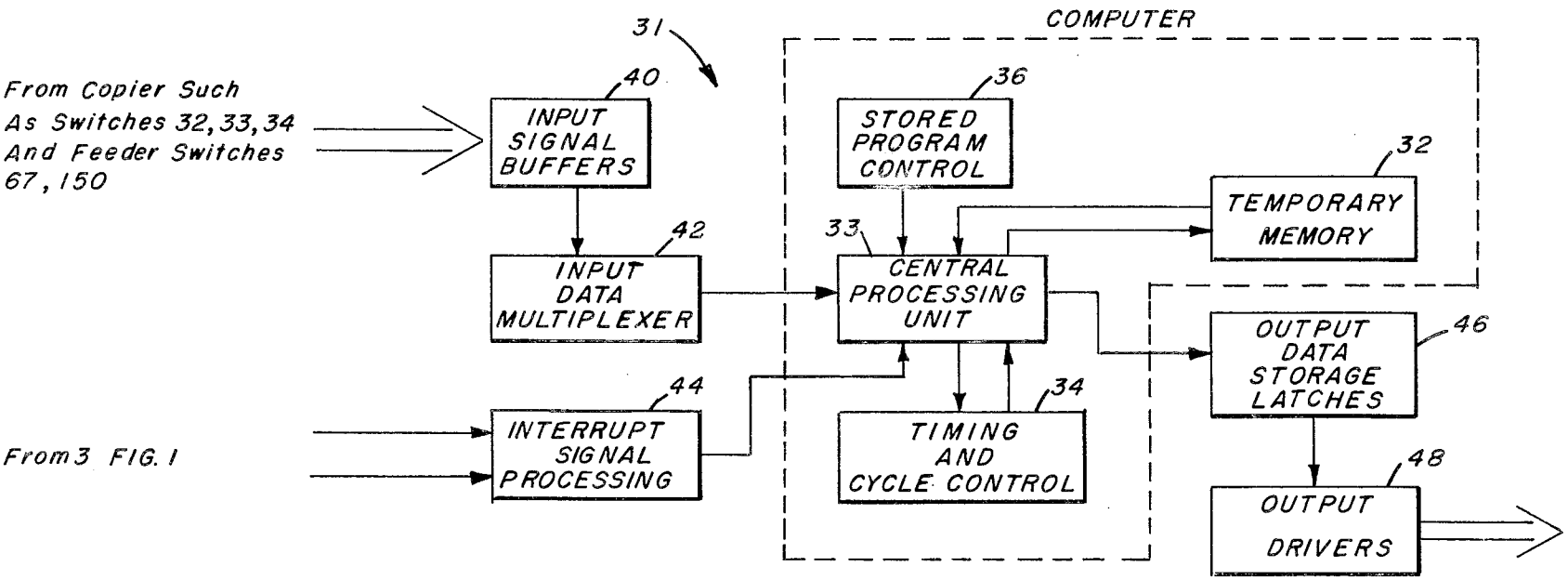
Figure 4:
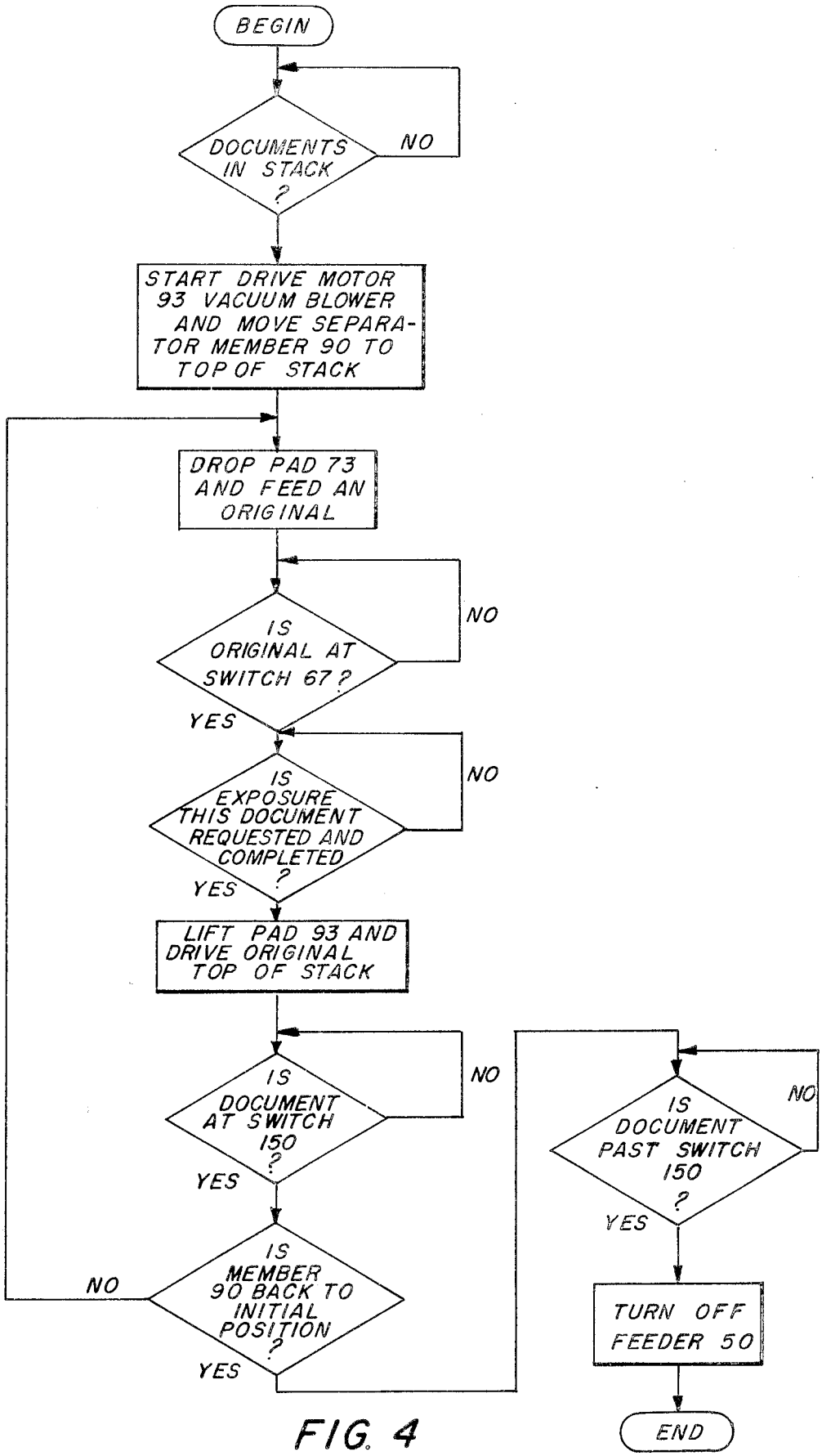
Figure 5:
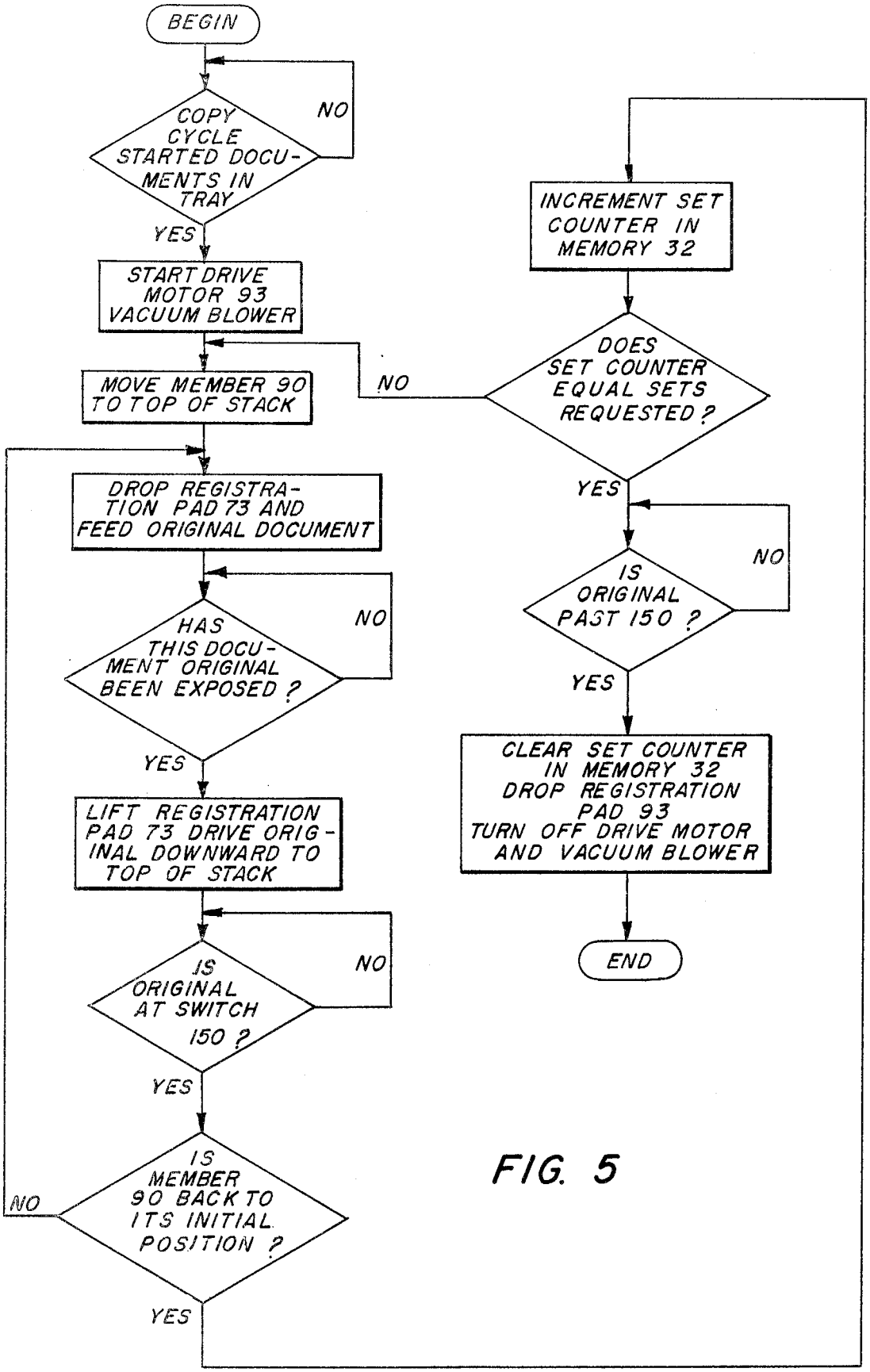
Figure 6:
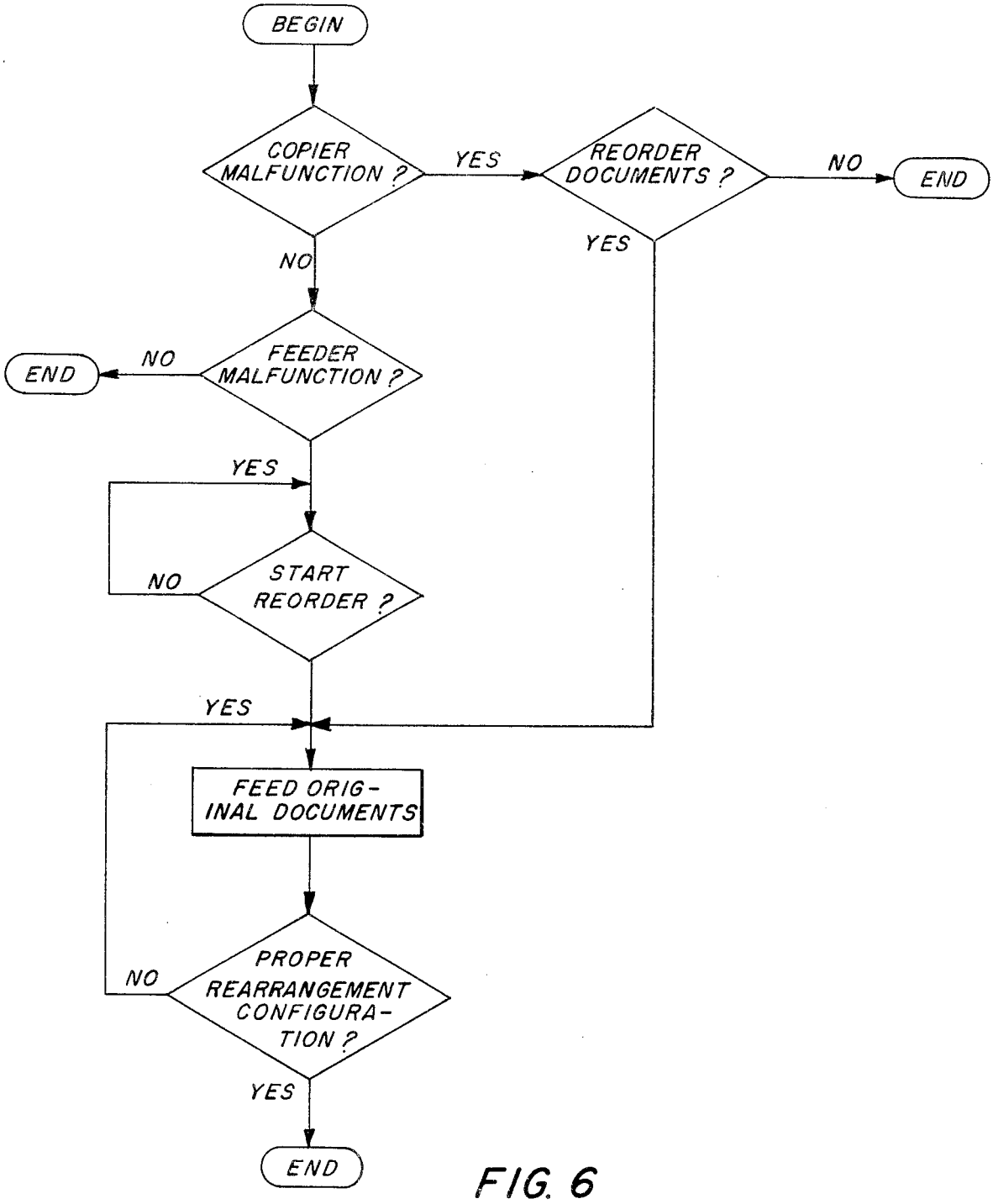
Figure 7:
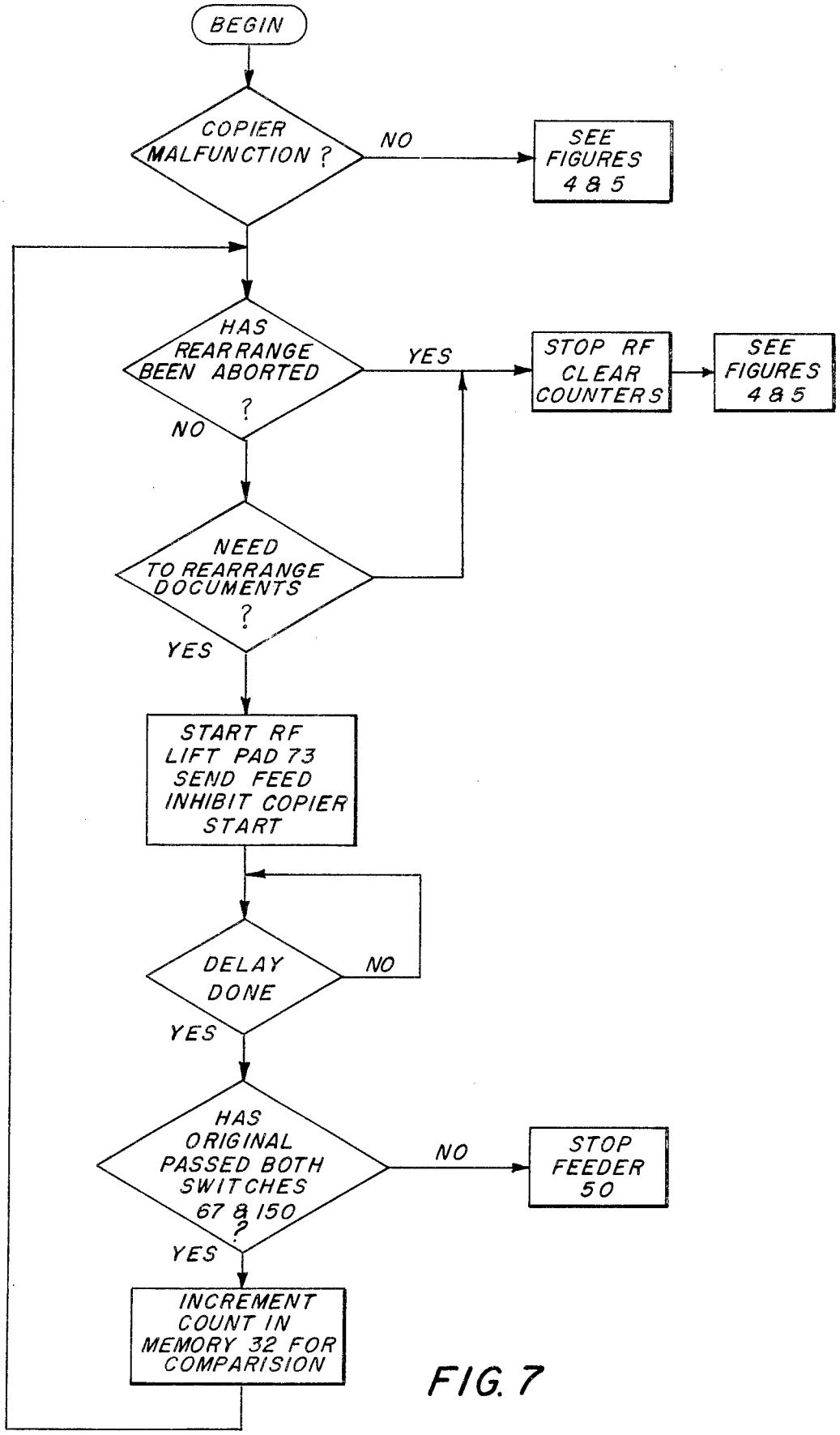
Figure 8:
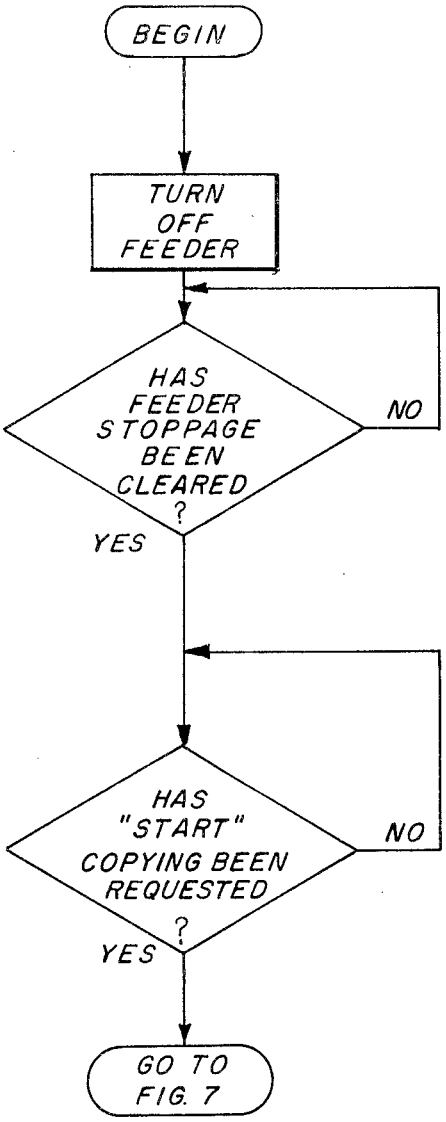
Figure 9:
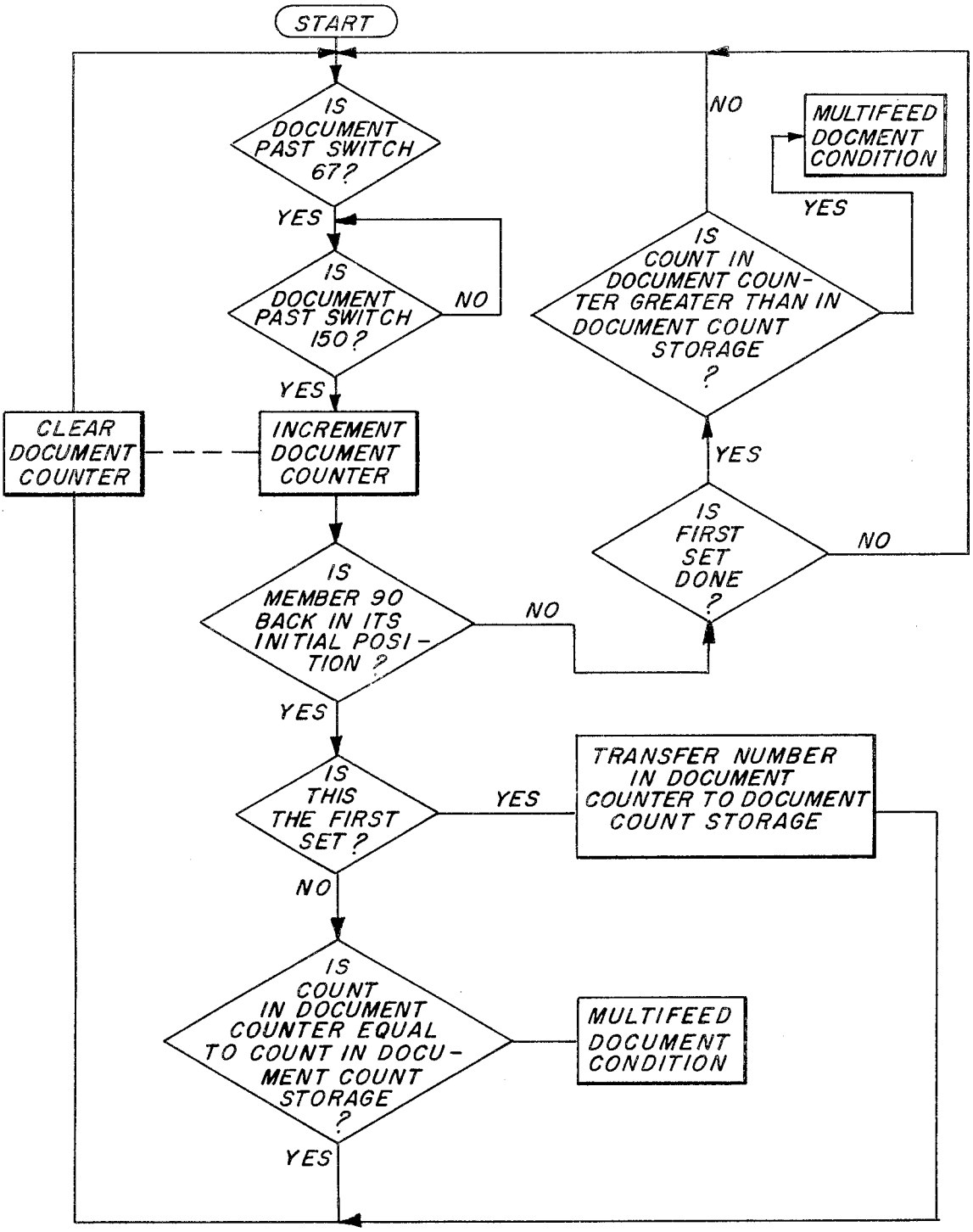

United States Defensive Publication [19] (H) [11] T957,006

Reid et al. [43] Apr. 5, 1977

[54] ORIGINAL DOCUMENT REARRANGEMENT APPARATUS FOR USE IN RECIRCULATING FEEDERS

[76] Inventors: Michael Gerald Reid, 2294 Manitou Road, Rochester, N.Y. 14606; William Edward Hunt, 39 Killarney Drive, Rochester, N.Y. 14616

[21] Appl. No.: 671,865

[22] Filed: Mar. 30, 1976

[51] Int. Cl.[2] ..... B65H 5/22

[52] U.S. Cl. ..... 271/3.1

[57] ABSTRACT

Apparatus is disclosed for automatically rearranging documents in a recirculating feeder when a malfunction, such as a paper jam, has occurred in the feeder or in the copier. The use of a recirculating feeder facilitates the collation of the final copies produced by the copier without the need for a sorter accessory. If a malfunction, such as a paper jam, occurs in the copier, the automatic rearrangement apparatus initiates a feeding sequence in the feeder and causes the feeder to rearrange the original documents until the appropriate document is at the bottom of the stack for continuity in copying by the copier. If a malfunction occurs in the feeder, after the operator corrects the malfunction and replaces the original documents in their initial order in the feeder, the automatic rearrangement apparatus initiates a feeding sequence and rearranges the documents until the appropriate document is at the bottom of the stack for continuity in copying by the copier. At this time, the copier is ready to resume normal operation.

2 Claims, 9 Sheets Drawing,

32 Pages Specification

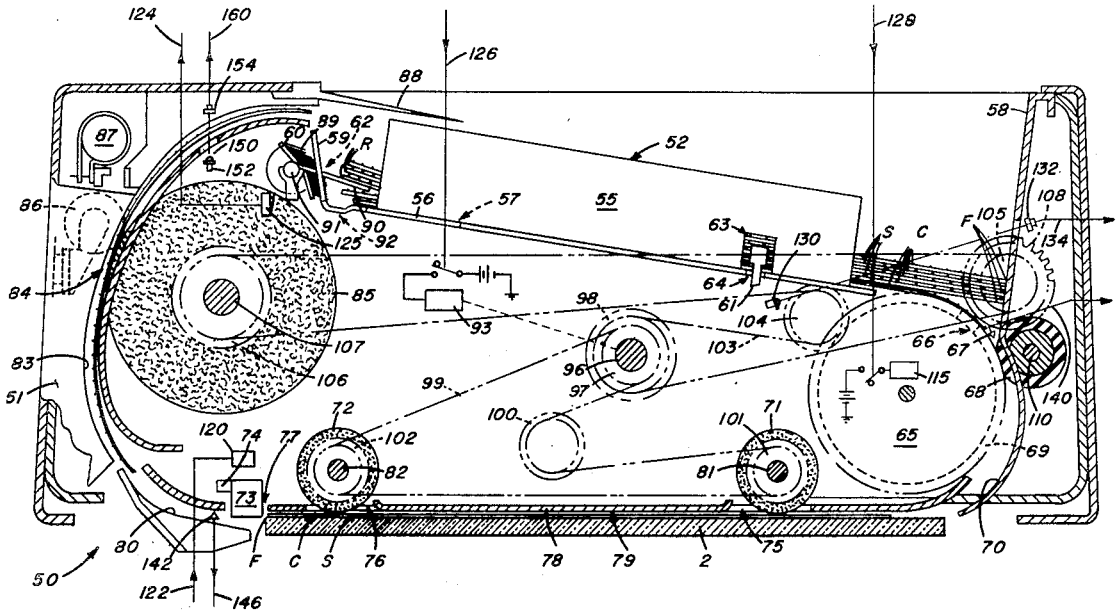

The file of this unexamined application may be inspected and copies thereof may be purchased (849 O.G. 1221, Apr. 9, 1968).